(12) United States Patent
Schneider

(10) Patent No.: US 9,219,376 B2
(45) Date of Patent: Dec. 22, 2015

(54) CHARGING CIRCUIT WITH CURRENT REGULATION

(75) Inventor: Gerhard Schneider, Vienna (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 942 days.

(21) Appl. No.: 13/390,426

(22) PCT Filed: Sep. 1, 2010

(86) PCT No.: PCT/IB2010/053915
§ 371 (c)(1),
(2), (4) Date: Feb. 14, 2012

(87) PCT Pub. No.: WO2011/027297
PCT Pub. Date: Mar. 10, 2011

(65) Prior Publication Data
US 2012/0139502 A1 Jun. 7, 2012

(30) Foreign Application Priority Data
Sep. 3, 2009 (CN) .......................... 2009 1 0170697

(51) Int. Cl.
*H02J 7/00* (2006.01)
*H02J 7/04* (2006.01)
*H02J 7/34* (2006.01)

(52) U.S. Cl.
CPC .............. *H02J 7/0083* (2013.01); *H02J 7/0055* (2013.01); *H02J 7/0081* (2013.01); *H02J 7/045* (2013.01); *H02J 7/345* (2013.01); *H02J 2007/0062* (2013.01)

(58) Field of Classification Search
CPC ..................................................... H02J 7/0083
USPC ........................................ 320/167, 103, 145
See application file for complete search history.

(56) References Cited

U.S. PATENT DOCUMENTS

| 5,710,506 | A | 1/1998 | Broell et al. | |
|---|---|---|---|---|
| 5,998,972 | A | 12/1999 | Gong | |
| 7,170,260 | B2 * | 1/2007 | Thrap | 320/166 |
| 8,264,208 | B2 * | 9/2012 | Wardensky | 320/166 |
| 2008/0129270 | A1 | 6/2008 | Kawk | |
| 2008/0238356 | A1 | 10/2008 | Batson | |
| 2008/0238361 | A1 | 10/2008 | Pinnell et al. | |
| 2009/0096427 | A1 | 4/2009 | Yang | |
| 2009/0102431 | A1 | 4/2009 | Kung et al. | |

FOREIGN PATENT DOCUMENTS

| CN | 1426151 A | 6/2003 |
|---|---|---|
| CN | 101026309 A | 8/2007 |
| CN | 101051762 A | 10/2007 |

(Continued)

*Primary Examiner* — Richard V Muralidar
(74) *Attorney, Agent, or Firm* — Yuliya Mathis

(57) ABSTRACT

The present invention relates to a charging circuit (20) for charging an energy storage element (30). The charging circuit (20) comprises a feedback module (201), a controlling module (202), a switching module (203) and a storage module (204), wherein the controlling module (202) is configured to adjust the control signal so as to increase the ON-OFF ratio of the switching module (203) when the feedback signal is substantially smaller than a reference signal, or to adjust the control signal so as to decrease the ON-OFF ratio of the switching module (203) when the feedback signal is substantially larger than a reference signal. By applying the charging circuit (20), the charging time for the energy storage element (30) is shorter and therefore less power from the power source (10) is consumed.

13 Claims, 4 Drawing Sheets

(56) References Cited

FOREIGN PATENT DOCUMENTS

| JP | 1189108 A | 7/1989 |
| JP | 6153421 A | 5/1994 |
| JP | 2000092734 A | 3/2000 |
| JP | 2001268815 A | 9/2000 |
| JP | 2001169474 A | 6/2001 |
| JP | 2005341708 A | 12/2005 |

* cited by examiner

CHARGING CIRCUIT WITH CURRENT REGULATION

FIELD OF THE INVENTION

The invention relates to a charging circuit, especially a charging circuit for charging a fast-chargeable energy storage element.

BACKGROUND OF THE INVENTION

Supercapacitors have become an upcoming alternative to Li-Ion or NiMH rechargeable batteries. As compared to traditional rechargeable batteries, supercapacitors have the advantages of a very low self discharge, a very low source resistance, more life circles, no danger of fire or explosion and no limit on charging current.

As supercapacitors have the advantage of no limit on charging current, a very quick recharging of a supercapacitor becomes possible by means of increasing the charging current.

SUMMARY OF THE INVENTION

Usually every power source we can use to charge a device has limited current capabilities in some way. For example, a wall outlet may have a current limit of 500 or 1000 mA, which it is not allowed to exceed. A USB port, which is often used to charge mobile devices, has a current limit of 500 mA or only 100 mA, if a bus powered hub is used. Even the mains power is restricted by circuit breakers to a certain amount of Amperes.

In view of the current limit of the power source, it would be advantageous to achieve a charging circuit which couples to a power source and which can deliver the maximum current available without surpassing the current limit of the power source to charge an energy storage element, e.g. a supercapacitor, in less time and with greater power efficiency.

To better address the above concern, there is provided a charging circuit according to embodiments of the present invention.

In an embodiment, the charging circuit comprises a controlling module, a switching module, a storage module and a feedback module, wherein the feedback module is configured to generate a feedback signal which is fed to the controlling module on the basis of an input current drawn from a power source;

the controlling module is configured to generate a control signal on the basis of the feedback signal to control the switching module;

the storage module is configured to receive the input current drawn from the power source when the switching module is ON, and provide an output current to charge an energy storage element when the switching module is OFF;

wherein the controlling module is further configured to adjust the control signal so as to increase the ON-OFF ratio of the switching module when the feedback signal is substantially smaller than a reference signal, or to adjust the control signal so as to decrease the ON-OFF ratio of the switching module when the feedback signal is substantially larger than a reference signal.

In some embodiments, the controlling module, switching module, storage module and feedback module compose a step-down DC to DC converter. The feedback module generates the feedback signal on the basis of the input current drawn from the power source and feeds it to the controlling module. The controlling module outputs the control signal on the basis of the feedback signal to control the switching module to be ON or OFF. When the switching module is ON, the storage module is connected to the power source to receive the input current drawn from the power source and store energy. When the switching module is OFF, the storage module outputs the output current to charge the energy storage element.

Furthermore, the controlling module will adjust the control signal so as to increase the ON-OFF ratio of the switching module when the input current is substantially smaller than the current limit of the power source. As the ON-OFF ratio of the switching module is increased, more output current flows into the energy storage element and thus the output voltage across the energy storage element rises.

The controlling module will adjust the control signal so as to decrease the ON-OFF ratio of the switching module when the input current is substantially larger than the current limit of the power source. As the ON-OFF ratio of the switching module is decreased, less output current flows into the energy storage element and thus the output voltage across the energy storage element drops.

As the controlling module adjusts the control signal dynamically on the basis of the feedback signal from the feedback module, the input current is held constant at the current limit of the power source and the output current is always kept as large as possible so as to charge the energy storage element as fast as possible.

In addition, as for the step-down DC to DC converter, the output current for charging the energy storage element is larger than the input current drawn from the power source as long as the output voltage across the energy storage element is smaller than the input voltage drawn from the power source. As a result, the charging time for the energy storage element is shorter.

Optionally, the charging circuit further comprises a charging controlling module, wherein the charging controlling module is configured to control the storage module to stop charging the energy storage element when the charging voltage across the energy storage element is larger than a predetermined voltage threshold.

Optionally, the predetermined voltage threshold is substantially smaller than the maximum allowed charging voltage of the energy storage element.

Each energy storage element, e.g. supercapacitor, has a maximum allowed charging voltage and once the charging voltage across the energy storage element is larger than the maximum allowed charging voltage, the energy storage element will be damaged. The charging controlling module can control the storage module to stop charging the energy storage element when the charging voltage across the energy storage element reaches the maximum allowed charging voltage so as to prevent damage to the energy storage element in a more effective way.

Optionally, the charging circuit further comprises an anti-flowing-back module arranged between the storage module and the energy storage element and configured to prevent current flowing back from the energy storage element into the storage module when the power source is OFF.

These and other aspects of the invention will be apparent from and elucidated with reference to the embodiments described hereinafter.

DESCRIPTION OF THE DRAWINGS

The above and other objects and features of the present invention will become more apparent from the following detailed description considered in connection with the accompanying drawings, in which.

The same reference numerals are used to denote similar parts throughout the Figures.

DETAILED DESCRIPTION

Descriptions of embodiments of the present invention are provided in detail hereinbelow, in conjunction with the accompanying drawings.

Figure 1:
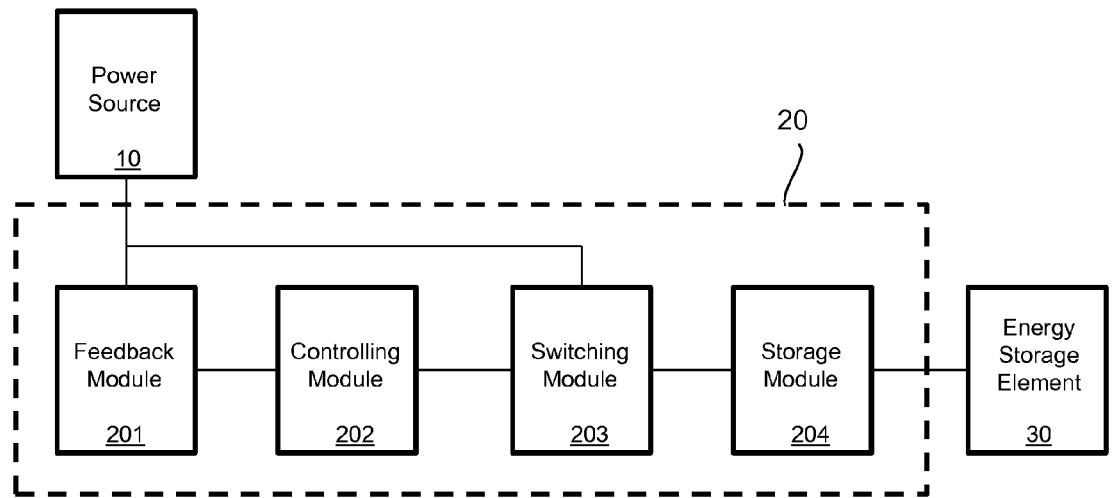
FIG. 1 illustrates a charging circuit according to an embodiment of the present invention.

FIG. 1 illustrates a charging circuit 20 according to an embodiment of the present invention. The charging circuit 20 is coupled to a power source 10 and used for charging an energy storage element 30.

The power source 10 comprises, but is not limited to, a wall outlet or a USB port.

The energy storage element 30 comprises, but is not limited to, a supercapacitor or a fast-chargeable Li-Ion battery.

It is to be noted that any energy storage element which is suitable for very quick recharging could be used in the present invention.

Referring to FIG. 1, the dashed pane indicates the charging circuit 20 which comprises a feedback module 201, a controlling module 202, a switching module 203 and a storage module 204.

The feedback module 201 is configured to generate a feedback signal on the basis of the input current drawn from the power source 10 and feed the feedback signal to the controlling module 202.

The controlling module 202 is configured to generate a control signal on the basis of the feedback signal to control the switching module 203 to be ON-OFF.

Optionally, the control signal is a square wave signal. During one cycle of the square wave signal, logic high enables the switching module 203 to be switched on and logic low enables the switching module 203 to be switched off.

When the switching module 203 is switched on, the storage module 204 is connected to the power source 10 to receive the input current drawn from the power source 10 and store energy.

When the switching module 203 is switched off, the storage module 204 outputs the output current to charge the energy storage element 30.

The switching module 203 comprises, but is not limited to, a MOSFET (Metal Oxide Semiconductor Field Effect Transistor) or a Bipolar Junction Transistor.

The storage module 204 comprises, but is not limited to, an inductor.

Furthermore, the controlling module 202 is further configured to adjust the control signal so as to increase the ON-OFF ratio of the switching module 203 when the feedback signal is substantially smaller than a reference signal, or to adjust the control signal so as to decrease ON-OFF ratio of the switching module 203 when the feedback signal is substantially larger than a reference signal.

It is to be noted that the control signal can be a PWM signal or a PFM signal, that is to say, the controlling module 202 can operate based on PWM or PFM.

It is further to be noted that the controlling module 202 can be made up of an integrated chip, e.g. MAX1584/1585, or of circuits composed of discrete components which have the same functions as the integrated chip.

In the case that the control signal is a PWM signal, the cycle of the control signal is constant and the ON time of the control signal within one cycle can be adjusted. When the feedback signal is substantially smaller than a reference signal, the controlling module 202 is further configured to adjust the control signal to increase the ON time of the control signal so as to increase the ON-OFF ratio of the switching module 203, or when the feedback signal is substantially larger than a reference signal, the controlling module 202 is further configured to adjust the control signal to decrease the ON time of the control signal so as to decrease the ON-OFF ratio of the switching module 203.

In the case that the control signal is a PFM signal, the ON time of the control signal is constant and the OFF time of the control signal can be adjusted. When the feedback signal is substantially smaller than a reference signal, the controlling module 202 is further configured to adjust the control signal to decrease the OFF time of the control signal so as to increase the ON-OFF ratio of the switching module 203, or when the feedback signal is substantially larger than a reference signal, the controlling module 202 is further configured to adjust the control signal to increase the OFF time of the control signal so as to decrease the ON-OFF ratio of the switching module 203.

Optionally, the feedback signal generated by the feedback module 201 and fed into the controlling module 202 is exactly the input current drawn from the power source 10.

If the feedback signal is the input current drawn from the power source 10, then the reference signal is set substantially equal to the current limit of the power source 10.

Figure 2:
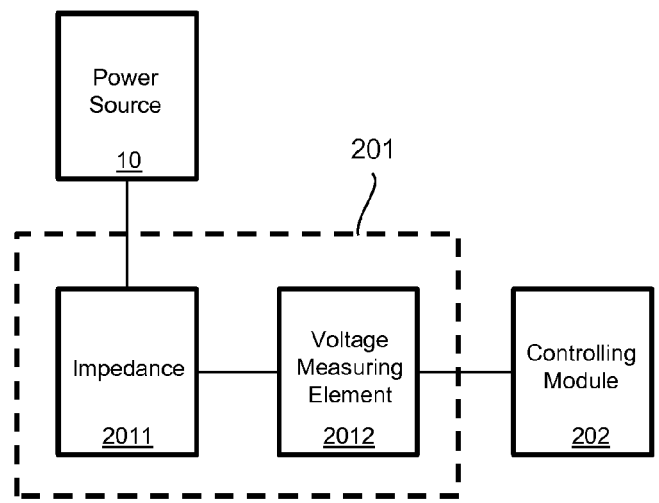
FIG. 2 illustrates a feedback module of the charging circuit according to an embodiment of the present invention.

In a variation, referring to FIG. 2, the dashed pane indicates the feedback module 201 which comprises an impedance 2011 and a voltage measuring element 2012.

The impedance 2011 is arranged between the power source 10 and the switching module 203, wherein the input current drawn from the power source 10 flows through the impedance 2011.

The voltage measuring element 2012 is configured to measure a first voltage across the impedance 2011 and generate the feedback signal to be fed to the controlling module 202 on the basis of the first voltage.

If the feedback signal fed into the controlling module 202 is the first voltage across the impedance 2011, then the reference signal is set substantially equal to a product of the input current drawn from the power source 10 and the resistance of the impedance 2011.

The impedance 2011 can be made up of one resistor or a plurality of resistors.

Alternatively, the voltage measuring element 2012 can be a differential amplifier configured to amplify the first voltage across the impedance 2011 and output the amplified first voltage as the feedback signal to the controlling module 202.

If so, then the reference signal is set substantially equal to a product of the input current drawn from the power source 10, the resistance of the impedance 2011 and the amplification factor of the differential amplifier.

It is to be noted that the comparison between the feedback signal and the reference signal is actually equivalent to the comparison between the input current drawn from the power source 10 and the current limit of the power source 10.

When the input current drawn from the power source 10 is substantially smaller than the current limit of the power source 10, the controlling module 202 will adjust the control signal so as to increase the ON-OFF ratio of the switching module 203.

As the ON-OFF ratio of the switching module 203 is increased, more output current flows into the energy storage element 30 and thus the output voltage across the energy storage element 30 rises.

When the input current drawn from the power source 10 is substantially larger than the current limit of the power source 10, the controlling module 202 will adjust the control signal so as to decrease the ON-OFF ratio of the switching module 203.

As the ON-OFF ratio of the switching module 203 is decreased, less output current flows into the energy storage element 30 and thus the output voltage across the energy storage element 30 drops.

As the controlling module 202 adjusts the control signal dynamically on the basis of the feedback signal from the feedback module 201, the input current drawn from the power source 10 is held constant at the current limit of the power source 10 and the output current is always kept as large as possible so as to charge the energy storage element 30 as fast as possible.

In addition, as the charging circuit 20 is a step-down DC to DC converter, the output current for charging the energy storage element 30 is larger than the input current drawn from the power source 10 as long as the output voltage across the energy storage element 30 is smaller than the input voltage drawn from the power source 10. As a result, the charging time for the energy storage element 30 is shorter.

Figure 3:
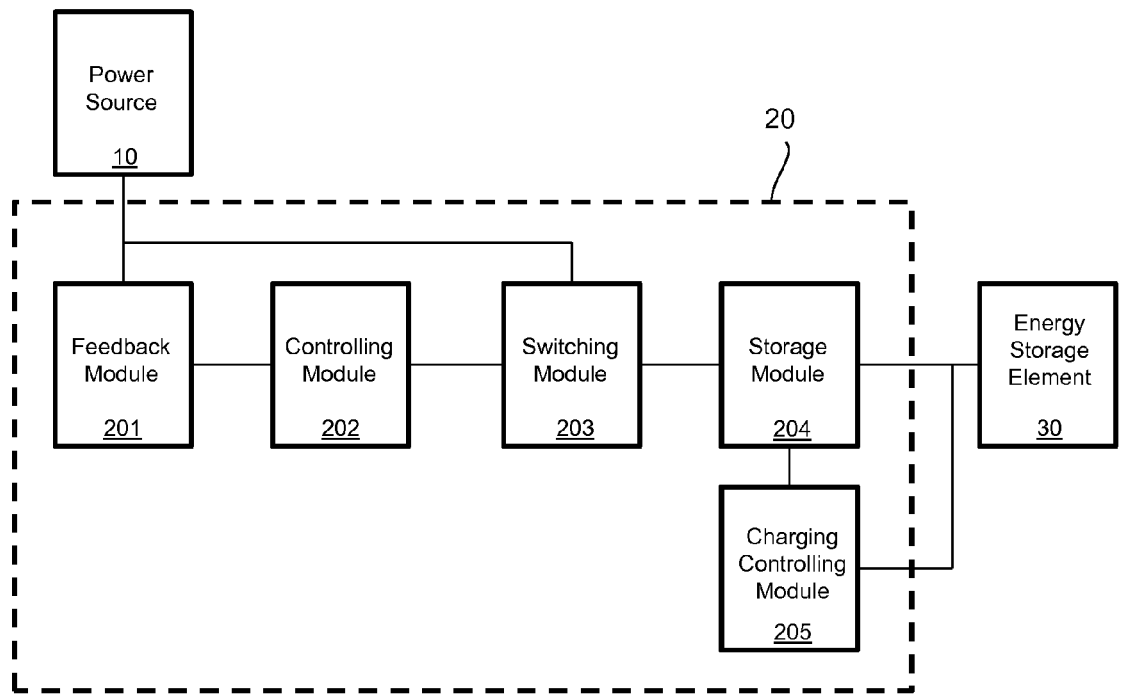
FIG. 3 illustrates a charging circuit according to another embodiment of the present invention.

Each energy storage element, e.g. a supercapacitor, has a maximum allowed charging voltage and the energy storage element will be damaged once the charging voltage across the energy storage element reaches the maximum allowed charging voltage; therefore, referring to FIG. 3, optionally, the charging circuit 20 further comprises a charging controlling module 205 which is configured to control the storage module 204 to stop charging the energy storage element 30 when the charging voltage across the energy storage element 30 is larger than a predetermined voltage threshold.

Optionally, the predetermined voltage threshold is substantially smaller than the maximum allowed charging voltage of the energy storage element 30.

Taking by way of example a supercapacitor as the energy storage element, if the maximum allowed charging voltage of the supercapacitor is 2.5V, then the predetermined voltage threshold can be set as high as 2.4V.

Optionally, the charging controlling module 205 can be a comparator. The comparator compares the charging voltage across the energy storage element 30 with the predetermined voltage threshold and controls the controlling module 202 to stop outputting the control signal when the charging voltage across the energy storage element 30 is larger than the predetermined voltage threshold.

Since the charging of the energy storage element 30 is terminated when the charging voltage across the energy storage element 30 is larger than the predetermined voltage threshold, the charging controlling module 205 effectively prevents the energy storage element 30 from being damaged.

Figure 4:
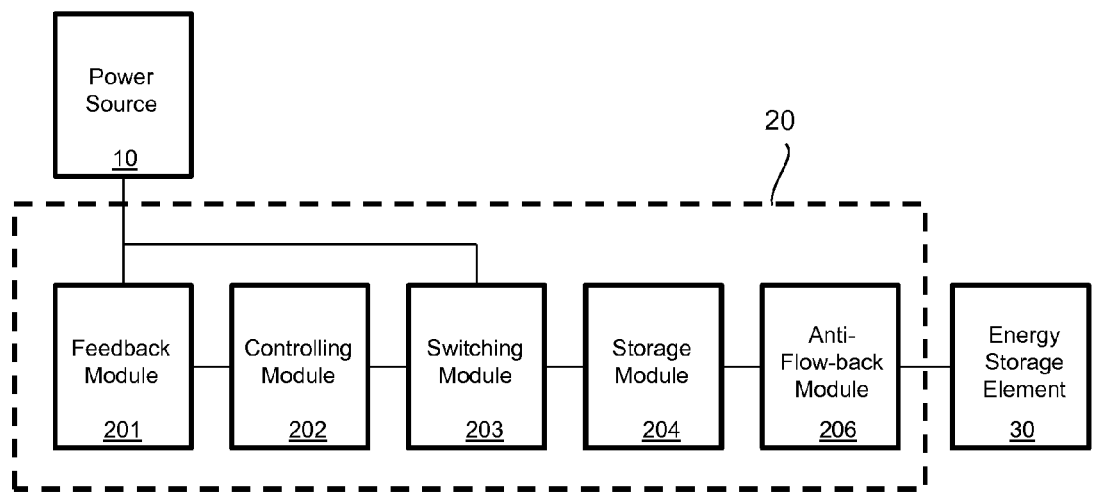
FIG. 4 illustrates a charging circuit according to a further embodiment of the present invention.

Referring to FIG. 4, optionally, the charging circuit 20 further comprises an anti-flowing-back module 206 which is arranged between the storage module 204 and the energy storage element 30 and which is configured to prevent current flowing back from the energy storage element 30 into the storage module 204 when the power source 10 is switched off.

Optionally, the anti-flowing-back module 206 can be a transistor controlled by the presence of an input voltage or a diode.

Besides the modules illustrated in FIG. 1 to FIG. 4, optionally, the charging circuit 20 can further comprise two filtering modules. One is configured to smooth the input voltage drawn from the power source 10 and the other is configured to smooth the output voltage across the energy storage element 30.

Optionally, the filtering module can be made up of one capacitor or a plurality of capacitors.

Hereinafter, referring to FIG. 5, an exemplary circuit of the charging circuit according to an embodiment of the present invention is elaborated.

Figure 5:
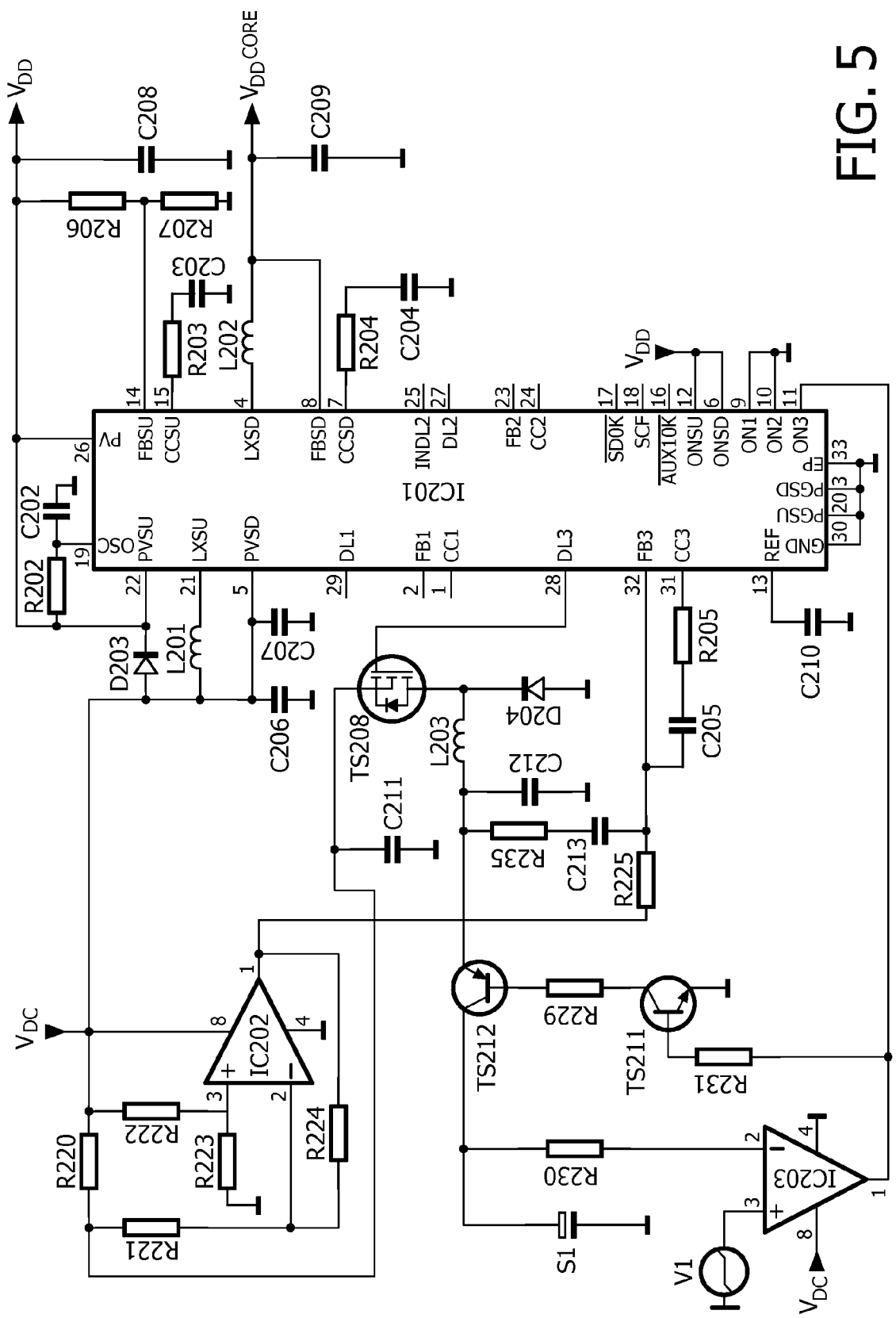
FIG. 5 illustrates an exemplary circuit of the charging circuit according to an embodiment of the present invention.

In FIG. 5, the integrated chip IC201, being MAX1584/1585 available from MAXIM Corporation, functions as the controlling module 202 in previous Figures. MAX1584/1585 includes 5 high-efficiency DC to DC conversion channels, but only one channel is used for the step-down DC to DC converter. In this embodiment, pin 32(FB3), pin 28(DL3), pin 31(CC3) and pin 11(ON3) are mainly used to realize the charging current booster.

It is to be noted that the resistors R202, R203, R204, R206, R207, the capacitors C202, C203, C204, C206, C207, C208, C209, C210, the inductors L201, L202 and the diode D203 are peripheral circuits, which are specific to MAX1584/1585. For the purpose of simplicity, their links to the pins of MAX1584/1585 will not be further elaborated here; for details thereon reference is made to the datasheet of MAX1584/1585.

In addition, pin 22(PVSU), pin 26(PV), pin 6(ONSD) and pin 12(ONSU) are connected to power supply $V_{DD}$ of the integrated chip IC201, pin 8(FBSD) is connected to power supply $V_{DD}$CORE, and pin 9(ON1), pin 10(ON2), pin 30(GND), pin 20(PGSU), pin 2(PGSD) and pin 33(EP) are connected to ground.

Referring to FIG. 5, the resistors R220, R221, R222, R223, R224 and the differential amplifier IC202 function as the feedback module 201 in the previous Figures, wherein the resistors R221, R222, R223 and R224 set the amplification factor of the differential amplifier IC202.

The +input of the differential amplifier IC202 is connected to one terminal of the resistor R220 which is close to the power source $V_{DC}$ through the resistor R222, the −input of the differential amplifier IC202 is connected to the other terminal of the resistor R220 through the resistor R221, and the output of the differential amplifier IC202 is connected to pin 32(FB3) of the integrated chip IC201 through the resistor R225. The power source $V_{DC}$ also powers the differential amplifier IC202.

In addition, the resistors R225, R235, R205 and the capacitors C213, C205 are compensation circuits which are used to stabilize the feedback module, and which are specific to MAX1584/1585.

The input current drawn from the power source $V_{DC}$ flows through the resistor R220. The differential amplifier IC202 amplifies the first voltage across the resistor R220 and outputs the amplified first voltage as the feedback signal to pin 32(FB3).

Optionally, the power source $V_{DC}$ can be a wall power supply or a USB port.

The integrated chip IC201 generates a control signal on pin 28(DL3) on the basis of the feedback signal input into pin 32(FB3) to control the MOSFET TS208 to be ON or OFF.

The gate of the MOSFET TS208 is connected to pin 28(DL3), the source of the MOSFET TS208 is connected to the power source $V_{DC}$ through the resistor R220, and the drain of the MOSFET TS208 is connected to ground through the diode D204, wherein the MOSFET TS208 constitutes the switching module 203 in previous Figures.

One terminal of the inductor L203 is connected to the drain of the MOSFET TS208 and the other terminal of the inductor of L203 is connected to the supercapacitor S1 through the transistor TS212, wherein the inductor L203 constitutes the storage module 204 in previous Figures.

When the MOSFET TS208 is switched on, the inductor L203 receives the input current drawn from the power source $V_{DC}$ and stores energy.

Once the MOSFET TS208 is switched on, the diode D204 is switched off and the input current drawn from the power source $V_{DC}$ flows through the inductor L203 and then into the supercapacitor S1.

When the MOSFET TS208 is switched off, the inductor L203 outputs the output current to charge the supercapacitor S1.

Once the MOSFET TS208 is switched off, the diode D204 is switched on and the inductor L203, the supercapacitor S1 and the diode D204 constitute a charging loop for the supercapacitor S1.

Furthermore, the integrated chip IC201 will further adjust the control signal so as to increase the ON-OFF ratio of the MOSFET TS208 when the feedback signal is substantially smaller than a reference signal, or it will adjust the control signal so as to decrease the ON-OFF ratio of the MOSFET TS208 when the feedback signal is substantially larger than a reference signal.

In this embodiment, the control signal is a PWM signal. Therefore, when the feedback signal is substantially smaller than a reference signal, the integrated chip IC201 will further adjust the control signal to increase the ON time of the control signal so as to increase the ON-OFF ratio of the MOSFET TS208, or when the feedback signal is substantially larger than a reference signal, the integrated chip IC201 will further adjust the control signal to decrease the ON time of the control signal so as to decrease the ON-OFF ratio of the MOSFET TS208.

As the integrated chip IC201 adjusts the control signal dynamically on the basis of the feedback signal input into pin 32(FB3), the input current drawn from the power source $V_{DC}$ is held constant at the current limit of the power source $V_{DC}$ and the output current is always kept as large as possible so as to charge the supercapacitor S1 as fast as possible.

In addition, as the integrated chip IC201 is a step-down DC to DC converter, the output current for charging the supercapacitor S1 is larger than the input current drawn from the power source $V_{DC}$ as long as the output voltage across the supercapacitor S1 is smaller than the input voltage drawn from the power source $V_{DC}$. As a result, the charging time for the supercapacitor S1 is shorter.

In addition, referring to FIG. 5, the comparator IC203 with hysteresis and the constant voltage source V1 compose the charging controlling module 205 illustrated in FIG. 3.

The −input of the comparator IC203 is connected to the supercapacitor S1 through a resistor R230 to derive the charging voltage across the supercapacitor S1, the +input of the comparator IC203 is connected to the constant voltage source V1, and the output of the comparator IC203 is connected to the pin 11(ON3) of the integrated chip IC201. The comparator IC203 is supplied by the power source $V_{DC}$.

Assuming the maximum allowed charging voltage of the supercapacitor S1 is 2.5V, optionally, the constant voltage source V1 is chosen substantially equal to 2.4V.

When the charging voltage across the supercapacitor S1 is smaller than 2.4V, the comparator IC203 outputs logic high to pin 11 (ON3) and the integrated chip IC201 is in operation.

When the charging voltage across the supercapacitor S1 is larger than 2.4V, the comparator IC203 outputs logic low to pin11 (ON3) and hence the pin 28(DL3) of the integrated chip IC201 stops outputting the control signal, which terminates the charging of the supercapacitor S1.

Since the charging of the supercapacitor S1 is terminated when the charging voltage across the supercapacitor S1 is larger than 2.4V, any damage to the supercapactior S1 due to overcharging is effectively prevented.

Optionally, the resistor R230 is a high ohmic resistor, e.g. several hundred kilo ohm, so as to prevent the supercapacitor S1 from discharging through the −input of the comparator IC203 when the comparator IC203 is not powered.

Furthermore, the PNP transistor TS212, the NPN transistor TS211 and the resistors R229, R231 compose the anti-flowing-back module 206 illustrated in FIG. 4.

The transistor TS212 is arranged between the supercapacitor S1 and the inductor L203. The collector of the transistor TS212 is connected to the supercapacitor S1, the emitter of the transistor TS212 is connected to the inductor L203, and the base of the transistor TS212 is connected to the collector of the transistor TS211 through the resistor R229.

The emitter of the transistor TS211 is connected to ground and the base of the transistor of the transistor TS211 is connected to the output of the comparator IC203 through the resistor R231.

During the charging of the supercapacitor S1, the comparator IC203 outputs logic high, therefore the transistor TS211 is switched on and the base of the transistor TS212 is pulled to logic low and hence the transistor TS212 is switched on.

When the power source $V_{DC}$ is switched off, the comparator IC203 is not powered and therefore outputs logic low. When the comparator IC203 outputs logic low, the transistor TS211 is switched off and in turn the transistor TS212 is also switched off. Therefore, current flowing back from the supercapacitor S1 into the inductor L203 is prevented in a more effective way.

In addition, referring to FIG. 5, the capacitor C211 is connected to the source of the MOSFET TS208 so as to smooth the input voltage drawn from the power source $V_{DC}$ and the capacitor C212 is connected to the emitter of the transistor TS212 so as to smooth the output voltage across the supercapacitor S1.

It is to be noted that the above embodiment illustrated in FIG. 5 is exemplary and not to be construed in a restrictive sense.

Figure 6:
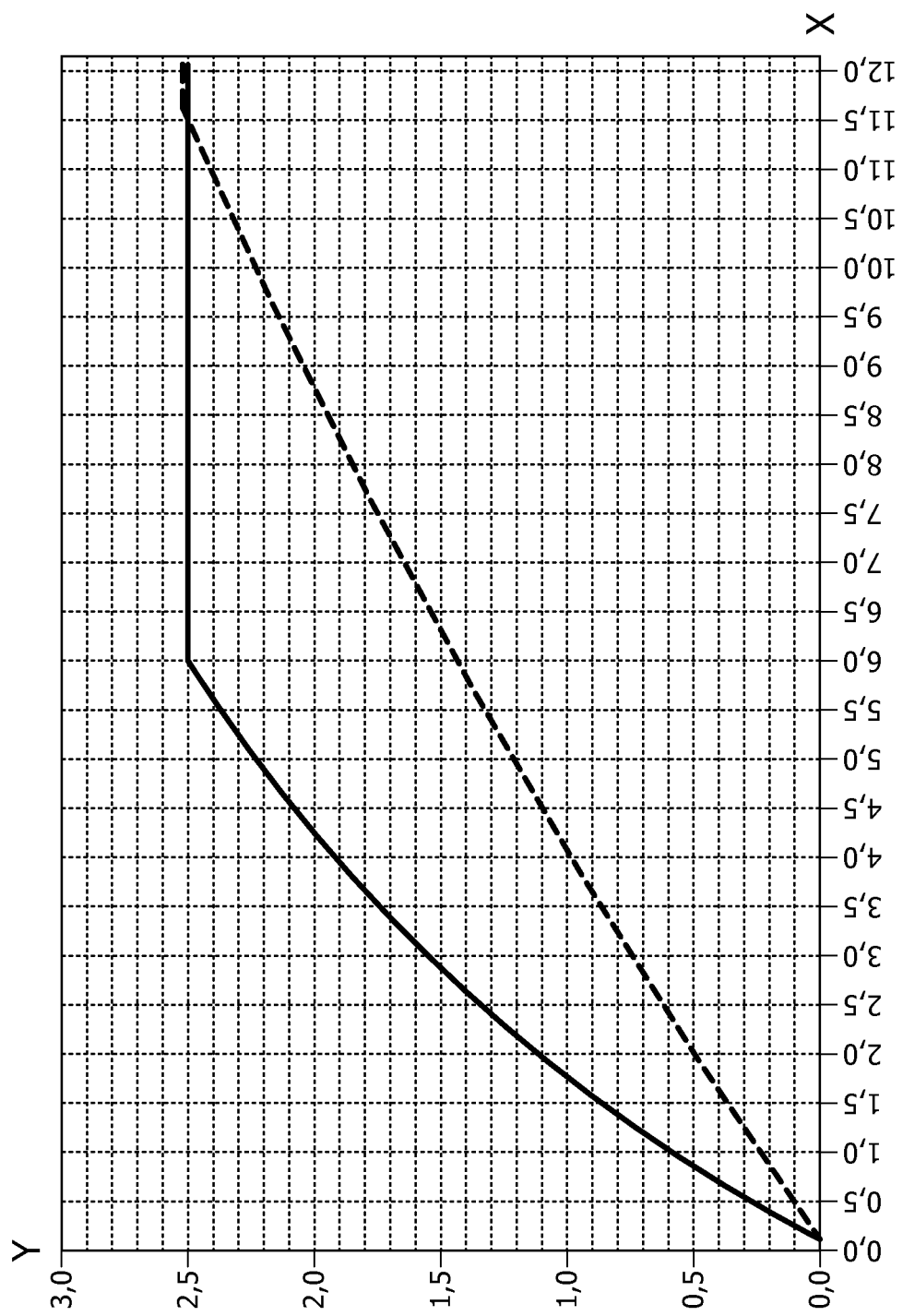
FIG. 6 is a charging performance comparison diagram.

FIG. 6 is a charging performance comparison diagram. The x-coordinate represents charging time (minutes), and the y-coordinate represents the charging voltage (voltages) across the supercapacitor S1.

Referring to FIG. 6, the dashed curve shows the relation between the charging voltage and the charging time when using a USB port with a current limit of 500 mA to directly charge the supercapacitor S1.

The solid curve shows the relation between the charging voltage and the charging time when using the charging circuit illustrated in FIG. 5, wherein the power source $V_{DC}$ is a USB port which has a current limit of 500 mA and the supercapacitor S1 is 140 Farad with a maximum allowed charging voltage of 2.5V.

It can be seen from FIG. 6 that when using the charging circuit illustrated in FIG. 5 according to an embodiment of the present invention, the supercapacitor is charged to full capacity in nearly half the time compared to the traditional way of charging and therefore the charging only consumes half the power from the USB port.

It should be noted that the above-mentioned embodiments illustrate rather than limit the invention and that those skilled in the art would be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the apparatus claims enumerating several units, several of these units can be embodied by one and the same item of hardware or software. The usage of the words first, second and third, et cetera, does not indicate any ordering. These words are to be interpreted as names.

The invention claimed is:

1. A charging circuit comprising:
feedback module;
a controlling module;
a switching module; and
a storage module; wherein
the feedback module is configured to generate a feedback signal which is fed to the controlling module on the basis of an input current drawn from a power source;
the controlling module is configured to generate a control signal on the basis of the feedback signal to control the switching module;
the storage module is configured to receive the input current drawn from the power source when the switching module is ON, and provide an output current to charge an energy storage element when the switching module is OFF; and
the controlling module is further configured to adjust the control signal so as to increase the ON-OFF ratio of the switching module when the feedback signal is substantially smaller than a reference signal, or to adjust the control signal so as to decrease the ON-OFF ratio of the switching module when the feedback signal is substantially larger than the reference signal.

2. The charging circuit of claim 1, wherein the feedback module comprises:
an impedance arranged between the power source and the switching module, wherein the input current flows through the impedance;
a voltage measuring element configured to measure a first voltage across the impedance and generate the feedback signal on the basis of the first voltage.

3. The charging circuit of claim 2, wherein the voltage measuring element comprises a differential amplifier configured to amplify the first voltage across the impedance and output the amplified first voltage as the feedback signal to the controlling module.

4. The charging circuit of claim 1, further comprising a charging controlling module, wherein the charging controlling module is configured to control the storage module to stop charging the energy storage element when the charging voltage across the energy storage element is larger than a predetermined voltage threshold.

5. The charging circuit of claim 4, wherein the charging controlling module comprises a comparator configured to compare the charging voltage across the energy storage element with the predetermined voltage threshold, and to control the controlling module to stop generating the control signal when the charging voltage across the energy storage element is larger than the predetermined voltage threshold.

6. The charging circuit of claim 1, wherein the energy storage element comprises a supercapacitor or a fast-chargeable Li-Ion battery.

7. The charging circuit of claim 1, further comprising an anti-flowing-back module arranged between the storage module and the energy storage element and configured to prevent current flowing back from the energy storage element into the storage module when the power source is OFF.

8. The charging circuit of claim 1, wherein the switching module comprises a MOSFET or a Bipolar Junction Transistor.

9. The charging circuit of claim 1, wherein the storage module is an inductor.

10. The charging circuit of claim 1, wherein the control signal is a PWM signal or a PFM signal.

11. The charging circuit of claim 3, wherein the feedback signal is a product of the input current drawn from the power source, a value of the impedance, and an amplification factor of the differential amplifier.

12. The charging circuit of claim 11, wherein the reference signal is equal to a product of the current limit of the power source, a value of the impedance, and an amplification factor of the differential amplifier.

13. The charging circuit of claim 1, wherein the reference signal is equal to a current limit of the power source.

* * * * *